United States Patent [19]
Krause et al.

[11] Patent Number: 4,753,284
[45] Date of Patent: Jun. 28, 1988

[54] COOLING SYSTEM FOR ELECTRICAL MACHINE

[75] Inventors: Ingo-Edgar Krause; Gerhard Rössger; Otto Perner, all of Berlin, Fed. Rep. of Germany

[73] Assignee: Siemens Aktiengesellschaft, Munich, Fed. Rep. of Germany

[21] Appl. No.: 756,807

[22] Filed: Jul. 18, 1985

[30] Foreign Application Priority Data

Jul. 24, 1984 [DE] Fed. Rep. of Germany ....... 3427758

[51] Int. Cl.⁴ .............................................. H02K 9/00
[52] U.S. Cl. .................................... 165/11.1; 165/34; 310/53; 310/59; 310/54; 310/64; 310/68 C
[58] Field of Search ................... 165/34, 11.1; 310/53, 310/54, 57, 58, 59, 60 R, 64, 68 C

[56] References Cited

U.S. PATENT DOCUMENTS

| | | | |
|---|---|---|---|
| 2,970,232 | 1/1961 | Kilbourne | 310/54 |
| 3,089,969 | 5/1963 | Wiedemann | 310/53 |
| 3,167,113 | 1/1965 | Kleiss | 165/34 |
| 3,755,702 | 8/1973 | Willyoung | 310/53 |
| 4,008,755 | 2/1977 | Vandamme | 310/53 |
| 4,190,829 | 2/1980 | Schmitt et al. | 310/53 |
| 4,370,800 | 2/1983 | Kuzmin et al. | 310/59 |

OTHER PUBLICATIONS

Kurt Baltisberger et al., "Betriebsfahrungen mit vollständig Wassergekühlten Schenkelpolmaschinen", 1971, *Brown Boveri Mitt.*, pp. 18-24.

*Primary Examiner*—Albert W. Davis, Jr.
*Assistant Examiner*—John K. Ford
*Attorney, Agent, or Firm*—Kenyon & Kenyon

[57] ABSTRACT

A hydraulic circuit branch of a cooling system in thermal contact with the stator winding of a hydraulic power generator is provided with a feed tube divided into two separate input tube sections. The downstream ends of the input tube sections are connected to respective multiplicities of subsidiary hydraulic circuit branches in the form of winding bars via a pair of semi-circular manifolds. The current throughput through the winding bars is monitored by determining the difference between the rates of coolant flow through the approximately identical input tube sections. If the rates of coolant flow or throughputs in the input tube sections differ from one another by an amount which itself differs from a predetermined reference value by more than a preselected threshold, a warning signal is generated indicating that heat removal from the hydraulic power generator is being impaired.

17 Claims, 6 Drawing Sheets

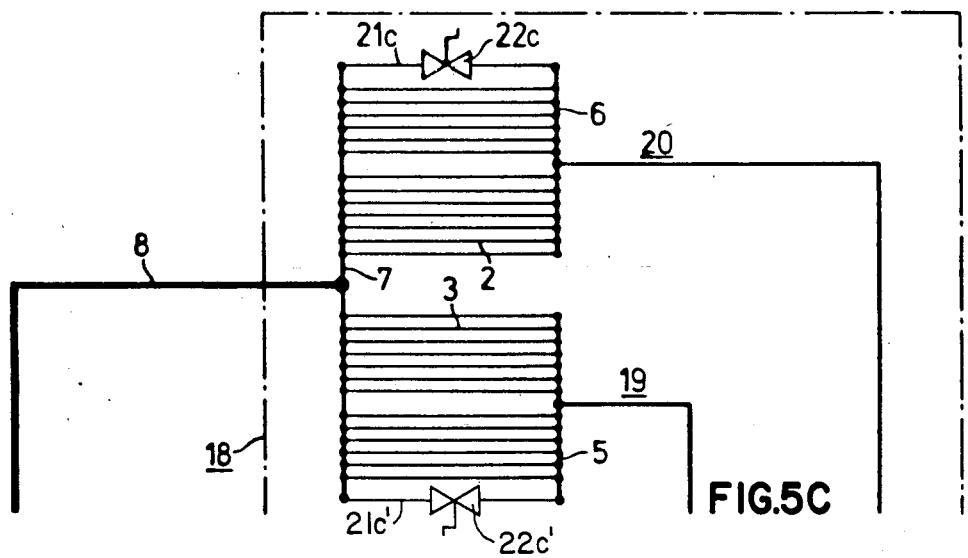
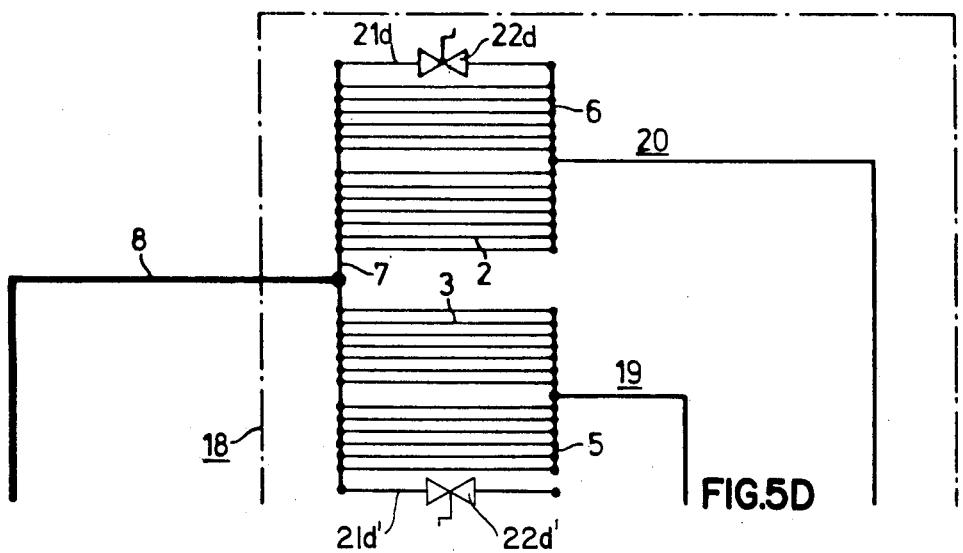

COOLING SYSTEM FOR ELECTRICAL MACHINE

This invention relates to a cooling system for controlling the temperature of the component parts of an electrical machine such as a hydraulic power generator.

A cooling system in a hydraulic power generator has a closed liquid cooling loop through which liquid coolant is circulated by a pump. The coolant is also circulated through a heat exchanger or cooler and through a coolant processing plant. The liquid cooling loop includes a plurality of parallel main branches located in different parts of the electrical machine, particularly in the stator winding, the rotor winding, the stator lamination stack and pressure plates. Each main branch contains several similar parallel subsidiary branches which extend between a respective feed tube and a respective discharge tube.

An electrical machine with such a cooling system is described in the publication *Brown, Boveri-Mitteilungen* 1971, pages 18 to 24. The liquid cooling loop disclosed in the publication contains four parallel main branches which are located in the rotor winding, the stator winding, the pressure plates and in the stator lamination yokes. These machine components are cooled by a liquid coolant which is circulated through the parallel main branches of the cooling loop or hydraulic circuit by a common feed pump. Each main branch of the liquid cooling loop contains several similar parallel subsidiary branches. For example the rotor pole coils form the subsidiary branches of the main rotor branch. Heat absorbed by the coolant in the machine parts is extracted from the coolant in a cooler which is common to the four main branches of the cooling system. The flow rate or throughput of the coolant is measured in each main branch.

During the operation of the cooling system disclosed in the Brown, Boveri publication, the temperature is measured in each subsidiary branch by means of thermocouples. The temperature at each measuring point is sampled at intervals of two seconds by a corotating magnetic stepping switch and the measured thermovoltages are fed via slip rings to a balance-type recorder. This discontinuous monitoring is expensive and result in a number of operating and maintenance difficulties.

An object of the present invention is to provide an improved cooling system of the above-described type.

Another, more particular, object of the present invention is to provide such a cooling system which is simple and not prone to difficulties.

Another particular object of the present invention is to provide such a cooling system which operates continuously.

SUMMARY OF THE INVENTION

A cooling system for an electrical machine having a plurality of separate parts comprises, in accordance with the invention, a hydraulic circuit with a plurality of main branches, a pump operatively connected to the hydraulic circuit for circulating a liquid coolant therethrough, and a heat exchanger operatively coupled to the hydraulic circuit for extracting heat energy from the coolant upon a passage thereof through the hydraulic circuit during operation of the electrical machine.

The parallel main branches of the hydraulic circuit each contain a multiplicity of substantially similar subsidiary branches connected in parallel to each other. Each main branch is located in a respective part of the electrical machine. The hydraulic circuit further includes a plurality of feed tubes equal in number to the main branches and a plurality of discharge tubes also equal in number to the main branches. In accordance with the invention the feed tube or the discharge tube of each main branch is subdivided into a pair of parallel tube sections. Each tube section is connected to approximately the half of the subsidiary branches of the associated main branch, while the other feed tube or discharge tube is connected to an input end or output end of the subsidiary branches of the associated main branch. Means are provided for comparing the rates of coolant flow through the tube sections of each pair of parallel tube sections and for generating a warning signal upon detecting that a measured difference between the rates of coolant flow through the tube sections of a pair of parallel tube sections differs from a preselected reference value by more than a predetermined threshold amount.

If the throughput of the liquid coolant is changed in a subsidiary branch during operation of the electrical machine, this subsidiary branch can no longer be cooled sufficiently and the electrical machine could be damaged. Monitoring the throughput in the feed or discharge tube of a main branch would not detect the change of throughput in a single subsidiary branch because the change would be too small in comparison to the magnitude of the total throughput, owing to the large number of parallel subsidiary branches in the electrical machine. In contrast, an evaluation circuit included in the cooling system of the present invention detects the change in the throughput in the tube sections associated with each main branch and generates a warning signal upon detecting a change of a predetermined size. The sensitivity of the comparing means and evaluation circuit of the present invention is high despite the simple design. Moreover, the arrangement has a substantial long-term stability. The number of points at which the coolant throughput is measured and, therefore, the probability of disturbances in the monitoring arrangement are small.

The monitoring of the throughput through a main branch of the hydraulic circuit and, therefore, of the temperature conditions thereof is simplified if the throughputs at the measuring points of the tube sections of the main branch are approximately equal during steady state, undisturbed operation of the electrical machine and cooling system. If the parallel subsidiary branches connected to the tube sections of the main branch are of unequal capacity so that in steady state, undisturbed operation the rate of coolant flow at the measuring points of the two tube sections would deviate from one another, it is advisable to provide in the main branch an adjustable valve for enabling the equalization of coolant flow through the tube sections. The adjustable valve is preferably disposed in a bypass line extending parallel to the subsidiary branches of the respective main branch or to a portion of a tube section associated with that respective main branch. The valve is adjusted to vary the rate of coolant flow through the bypass line and thereby equalize the coolant flow through the tube sections of the respective main branch during undisturbed operation of the electrical machine at steady state temperature conditions. In this case, the reference or standard against which the difference between the throughputs of the tube sections of a main branch is evaluated is zero.

The flow rates or throughputs of the liquid coolant through the tube sections of a main branch of the hydraulic circuit are advantageously measured by means of measuring orifices provided in the tube sections and connected to one another by a differential pressure pickup. Such an arrangement enables a directed determination of variation in the throughputs through the tube sections.

However, a pressure difference can also cause an equalization flow detectable by a throughput measuring device. The sensitivity of the monitoring process is increased in comparison with the case in which one differential pressure pickup is used.

DETAILED DESCRIPTION

Figure 1:
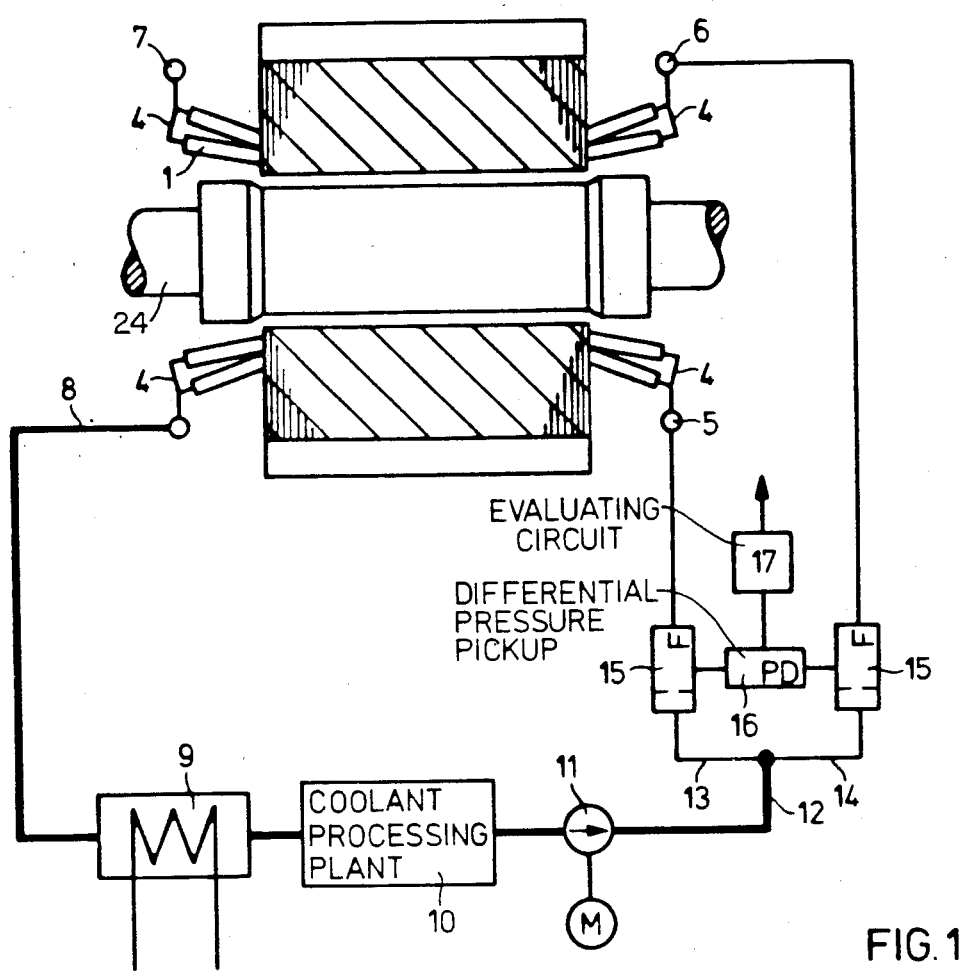
FIG. 1 is a schematic longitudinal cross-sectional view of an electrical machine with a liquid cooling system in accordance with the present invention, showing a pair of manifolds at respective end faces of the electrical machine.
Figure 2:
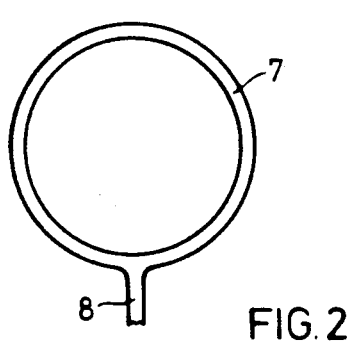
FIG. 2 is a schematic diagram of one of the manifolds illustrated in FIG. 1.
Figure 3:
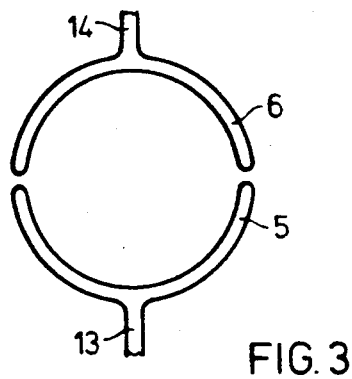
FIG. 3 is a schematic diagram of the other manifold shown in FIG. 1.

As illustrated in FIG. 1, a stator winding 1 of an electrical machine such as a hydraulic power generator is provided with windings bars 2 and 3 in which are located conduits or ducts for conducting a liquid coolant. The winding bars 2 and 3 are connected at one end face of the electrical machine via insulating TEFLON TM tubing 4 to two semicircular manifolds 5 and 6 and at an opposite end face of the electrical machine to a circular manifold 7. Circular manifold 7 is connected to a discharge tube 8 from which the liquid coolant is circulated through a heat exchanger or cooler 9, a coolant processing plant 10 and a feed pump 11 to a feed tube 12.

Feed tube 12 opens into two input tube sections 13 and 14 each having a measuring orifice 15 connected to the other measuring orifice via a differential pressure pickup 16. Via measuring orifices 15, differential pressure pickup 16 monitors the rates of coolant flow through tube sections 13 and 14 and compares the rates of coolant flow with one another. Differential pressure pickup 16 generates a signal indicative of the difference between the rates of coolant flow through tube sections 13 and 14 and transmits the signal to an evaluating circuit 17. Upon detecting that the measured difference between the rates of current flow through tube sections 13 and 14 differs from a preselected reference or standard by more than a predetermined amount, evaluating circuit 17 generates a warning signal detectable by an operator.

Figure 4:
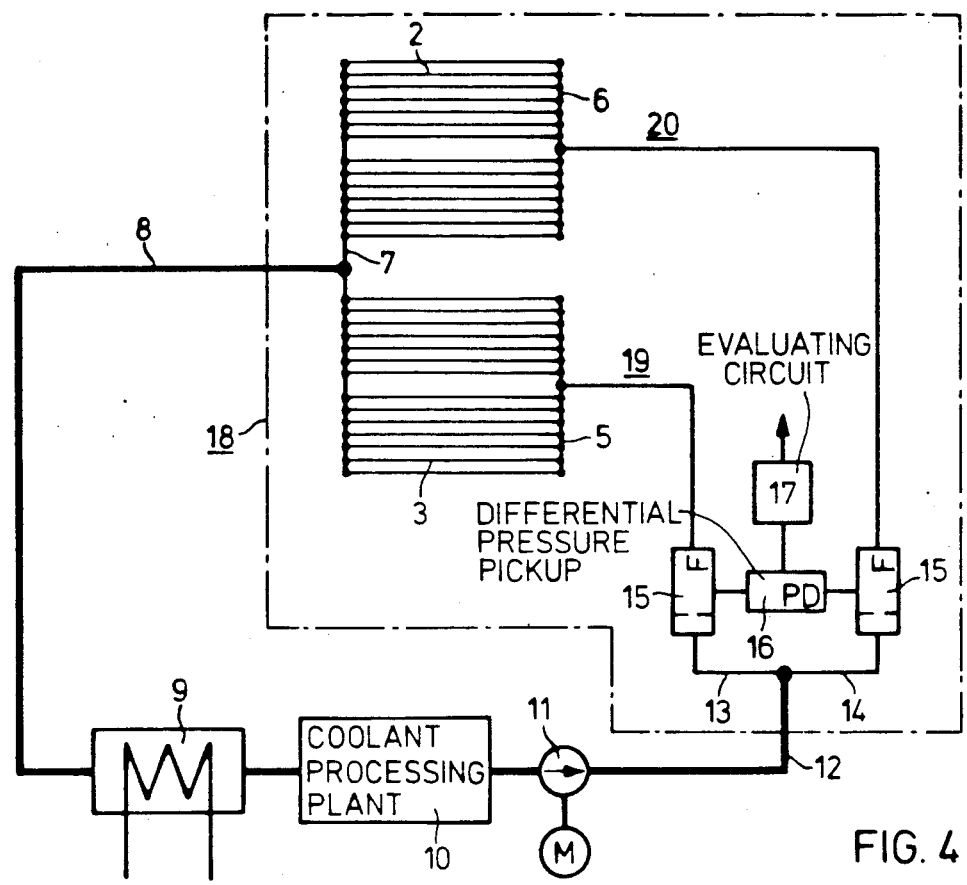
FIG. 4 is a diagram of the liquid cooling system illustrated in FIG. 1.

Input tube sections 13 and 14 are connected to semicircular manifolds 5 and 6, respectively, winding bars 3 being coupled to semicircular manifold 5 and winding bars 2 communicating with semicircular manifold 6 (compare FIGS. 1 and 4).

Inasmuch as stator winding 1 of the electrical machine is liquid-cooled while the rotor 24 is cooled by air, the hydraulic circuit or liquid cooling loop contains only one main branch 18 (see FIG. 4). The coolant, e.g., water, is circulated by pump 11 through main branch 18 where the coolant absorbs the dissipation heat of winding bars 2 and 3. The absorbed heat is subsequently extracted from the coolant in the heat exchanger or cooler 9.

As shown in FIGS. 1 and 4, coolant processing plant may be disposed in series with heat exchanger 9 and pump 11. Alternatively, coolant processing plant 10 may be disposed in parallel with those two components.

The division of feed tube 12 into the two input tube sections 13 and 14 results in the division of an input end of main branch 18 into two approximately identical subbranches 19 and 20. Each subbranch 19 and 20 in turn contains a multiplicity of parallel subsidiary branches in the form of winding bars 3 and 2. The coolant throughput through the winding bars and, therefore, the heat removal from the hydraulic power generator is monitored by comparing the rates of coolant flow through the two approximately identical branches 19 and 20.

In accordance with the invention, the throughputs through the two subbranches 19 and 20 (or, concomitantly, through tube sections 13 and 14) are determined in a simple manner via rugged measuring orifices 15. Differential pressure pickup 16 serves to continuously and instantaneously monitor the difference in coolant pressure at the two orifices 15. If the throughputs in input tube sections 13 and 14 are equal to one another, differential pressure pickup 16 generates a signal indicating a zero difference, provided that measuring orifices 15 are equally sized. In contrast, if the flow of coolant through a winding bar 2 or 3 is insufficient for proper cooling, the throughput through the respective input tube section 14 or 13 is changed and a difference between the pressures at the measuring orifices 15 is generated. This pressure difference, if greater than a predetermined threshold amount, results in the production of a warning equal by evaluating circuit 17.

It is possible to calibrate evaluating circuit 17 or measuring orifices 15 in order to compensate for a difference in througputs in the two input tube sections 13 and 14 due to a difference between the flow capacities of the two groups of subsidiary branches, i.e., winding bars 3 and 2. For example, evaluating circuit may be designed to generate a warning signal only if the detected difference between the rates of coolant flow or throughputs of the two input tube sections 13 and 14 differs from a preselected reference value other than zero by more than a predetermined threshold amount.

It is to be noted that the functions of measuring orifices 15 and differential pressure pickup 16, namely, monitoring and comparing the rate of coolant flow through the tube sections 13 and 14, can be performed by other devices such as thermocouples designed to measure the velocity of fluid motion.

Figure 5:
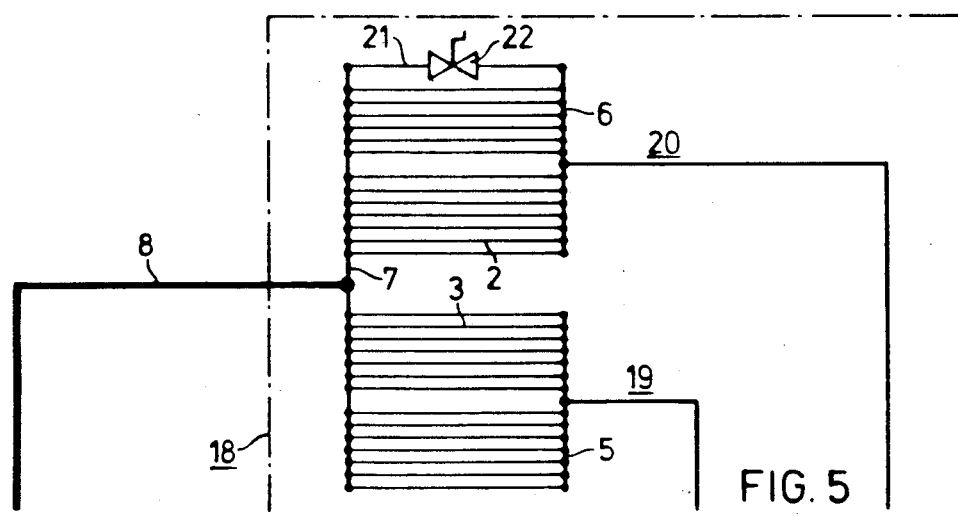
FIGS. 5A–5D are diagrams similar to FIG. 4, showing alternative embodiments of the cooling system in accordance with the invention.
Figure 5A:
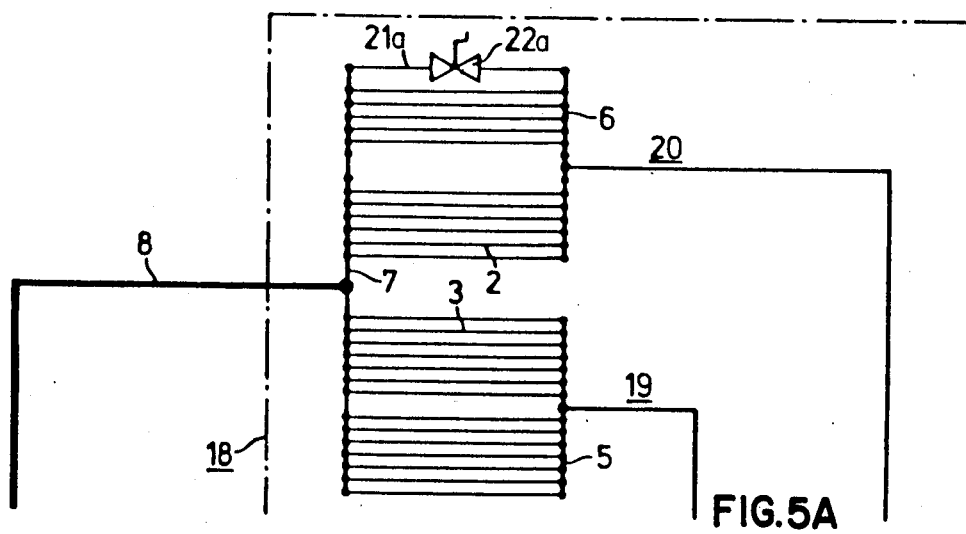

FIG. 5A illustrates an embodiment of the present invention wherein a bypass line 21a with an adjustable valve 22a is provided in parallel with the subsidiary branches or winding bars 2 between semicircular manifold 6 and circular manifold 7 for enabling the equalization of flow capacity between the one group of winding bars 2 and the other group of winding bars 3. As shown in FIG. 5A, the number of winding bars 2 connected to input tube section 14 is less than the number of winding bars 3 coupled with input tube section 13. By controlling valve 22a, the rates of coolant flow through tube sections 13 and 14 and, concomitantly, the pressures at the two measuring orifices 15 may be equalized for normal operation of the cooling system. If a disturbance arises, a pressure difference is generated which results in a warning signal produced by evaluating circuit 17.

Figure 5B:
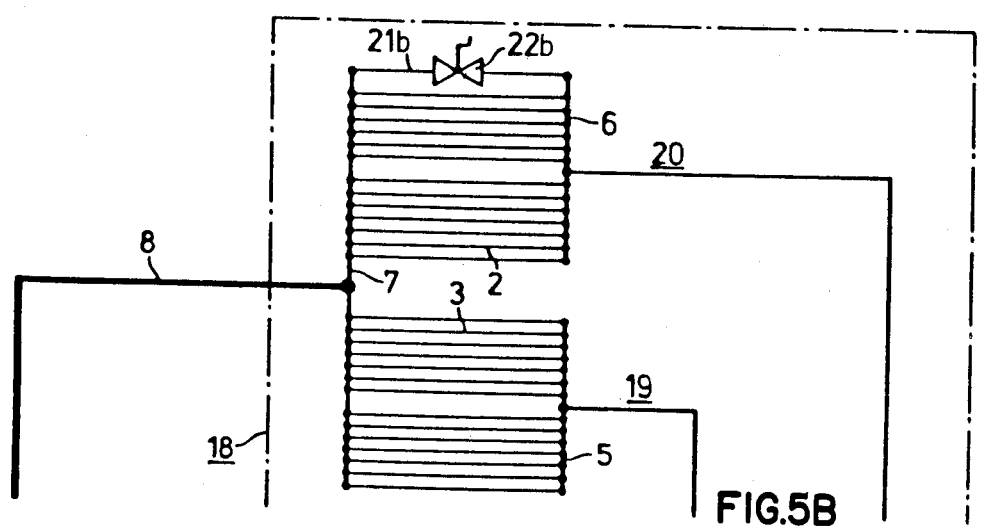

As depicted in FIG. 5B, a bypass line 21b with an adjustable valve 22b may be provided in parallel with the subsidiary branches or winding bars 2 and also in parallel with at least a portion of tube section 20. As set forth hereinabove with respective to FIG. 5A, the rates of coolant flow through tube sections 13 and 14 (See FIG. 4) may be equalized by appropriate control of valve 22b.

FIG. 5C depicts an embodiment of the present invention wherein a first bypass line 21c extending parallel with subsidiary branches 2 between semicircular manifold 6 and circular manifold 7 is provided with an adjustable valve 22c for enabling the equalization of flow capacity between the one group of winding bars 2 and the other group of winding bars 3. To the same end, another bypass line 21c' having an adjustable valve 22c' is provided in parallel with subsidiary branches or winding bars 3 between semicircular manifold 5 and circular manifold 7. Valves 22c and 22c' can be controlled together for equalizing the rates of cooling flow through tube section 13 and 14.

As shown in FIG. 5D, in yet another embodiment of the present invention, a first bypass lines 21d is provided partially in parallel with the subsidiary branches or winding bars 2 between semicircular manifold 6 and circular manifold 7 and partially in parallel with tube sections 14, while a second bypass line 21d' is provided partially in parallel with winding bars 3 between semicircular manifold 5 and circular manifold 7 and partially in parallel with tube section 13. Bypass lines 21d and 21d' each have a respective adjustable valve 22d and 22d' for enabling and facilitating the equalization of flow capacity between one group of winding bars 2 and the other group of winding bars 3. Valves 22d and 22d' are controllable simultaneously and in conjunction with one another to equalize coolant flow through tube section 13 and 14.

In order to achieve uniform flow conditions in input tube sections 13 and 14 and to thereby enable an accurate measurement of the rates of coolant flow, the length of input tube sections 13 and 14 must be sufficiently great. It is preferable that the distance between measuring orifices 15 and the junction between feed tube 12 and input tube sections 13 and 14 is approximately equal to twenty times the common diameter of the input tube sections 13 and 14. The same considerations apply to the distances between measuring orifices 15, on the one hand, and semicircular manifolds 5 and 6, on the other hand. The preferable dimensions result from the dimensions customary in hydraulic power generators.

Figure 6:
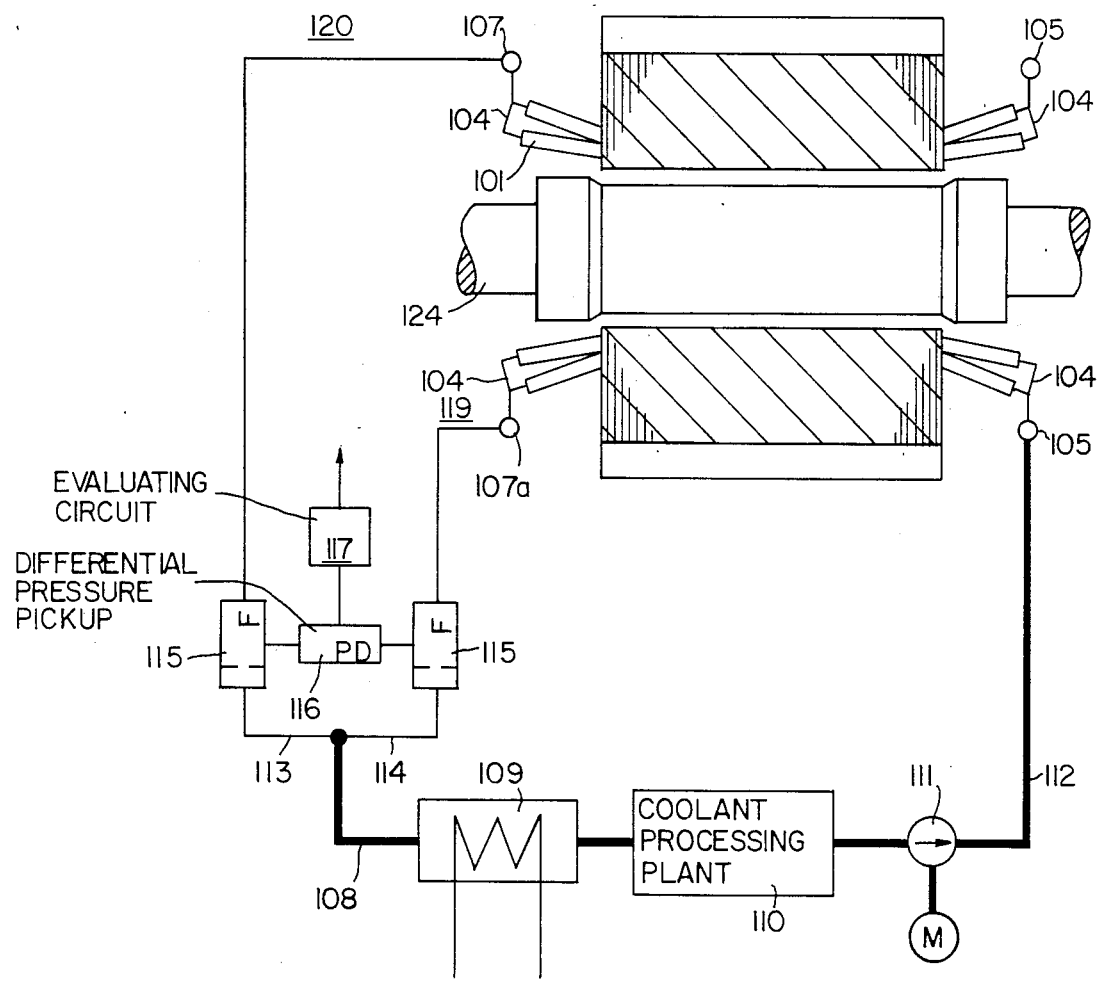
FIG. 6 is a schematic longitudinal cross-sectional view, similar to FIG. 1, of an electrical machine with another liquid cooling system in accordance with the present invention, showing a pair of manifolds at respective end faces of the electrical machine.
Figure 7:
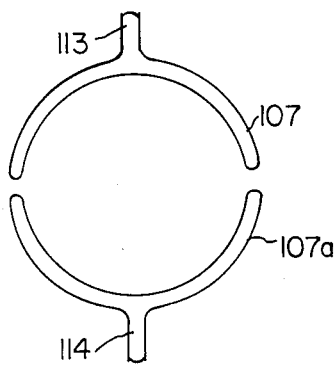
FIG. 7 is a schematic diagram of one of the manifolds illustrated in FIG. 6.
Figure 8:
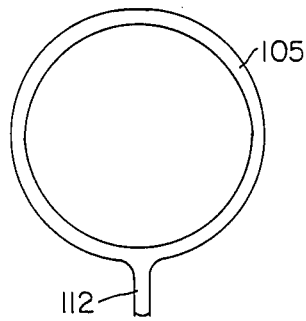
FIG. 8 is a schematic diagram of the other manifold shown in FIG. 6.
Figure 9:
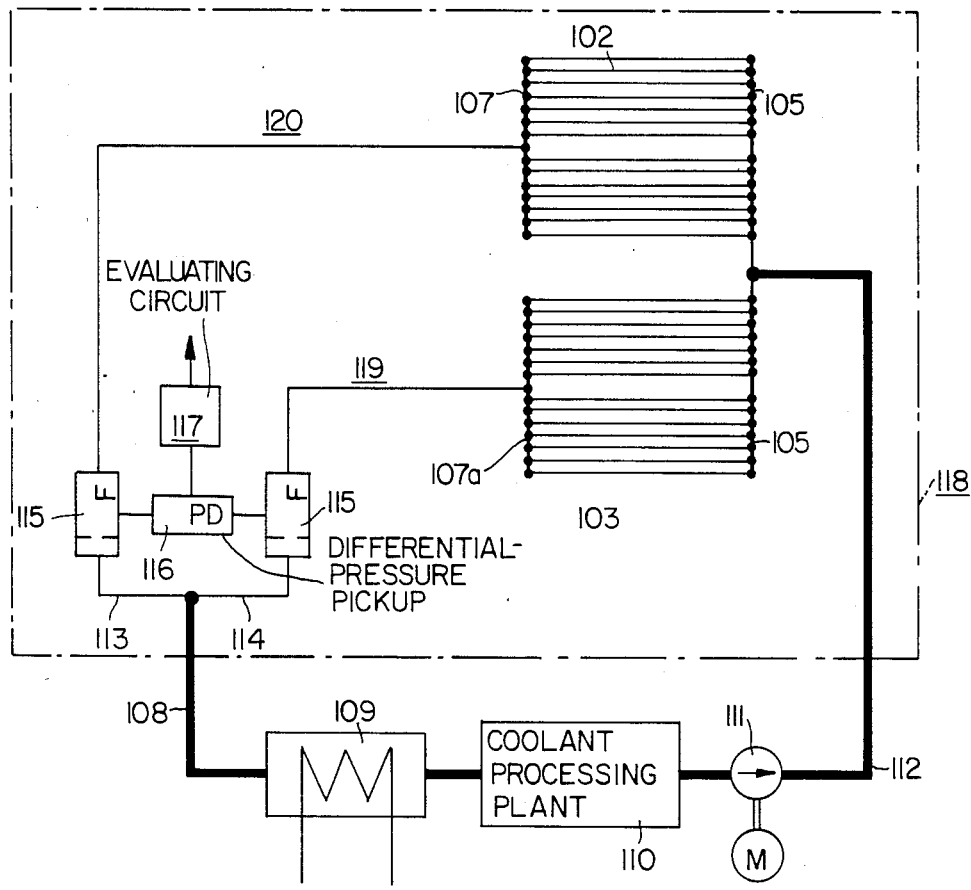
FIG. 9 is a diagram of the liquid cooling system illustrated in FIG. 6.

As illustrated in FIG. 6 a stator winding 101 of an electrical machine is provided with winding bars 102 and 103 (FIG. 9) in which are located conduits or ducts for conducting liquid coolant. Winding bars 102 and 103 are connected via insulating tubing 104 at one end face of the electrical machine to two semicircular manifold 107 and 107a and at an opposite end face of the electrical machine to a circular manifold 105. Circular manifold 105 is connected to an intake or feed tube 112 in turn connected on an input side to a heat exchanger or cooler 109, a coolant processing plant 110 and a feed pump 111.

Semicircular manifold 107 and 107a are connected to a discharge tube 108 via respective tube sections 113 and 114. Discharge tube 108 is in turn connected to an input of heat exchanger or cooler 109.

Output tube sections 113 and 114 each have a measuring orifice 115 connected to the other measuring orifice via a differential pressure pickup 116. Via measuring orifices 115, differential pressure pickup 116 monitors the rates of coolant flow through tube sections 113 and 114 and compares the rates of coolant flow which one another. Differential pressure pickup 116 generates a signal indicative of the difference between the rates of coolant flow through tube sections 113 and 114 and transmits the signal to an evaluating circuit 117. Upon detecting that the measured difference between the rates of current flow through discharge tube sections 113 and 114 differs from a preselected reference or standard by more than a predetermined amount, evaluating circuit 117 generates a warning signal detectable by an operator.

As discussed hereinabove with respective to FIG. 1, stator winding 101 of the electrical machine of FIG. 6 is liquid-cooled while the rotor 124 is cooled by air. Accordingly, the hydraulic circuit or liquid cooling loop contains only one main branch 118 (see FIG. 9). The coolant such as water is circulated by pump 111 through main branch 118 where the coolant absorbs the dissipation heat of winding bars 102 and 103. The absorbed heat is subsequently extracted from the coolant in heat exchanger or cooler 9.

The division of discharge tube 108 into two output tube sections 113 and 114 results in the division of an output end of main branch 18 into two approximately identical subbranches 119 and 120. EAch subbranch 119 and 120 in turn contains a multiplicity of parallel subsidiary branches in the form of winding bars 103 and 102, respectively. The coolant throughput through the winding bars and, therefore, the heat removal from the hydraulic power generator is monitored by comparing the rates of coolant flow through the two approximately identical branches 119 and 120.

As discussed hereinabove, the throughputs through the two subbranches 119 and 120 are determined in a simple manner via rugged measuring orifices 115. Differential pressure pickup 116 serves to continuously and instantaneously monitor the difference in coolant pressure at the two orifices 115. If the throughputs in output tube sections 113 and 114 are equal to one another, differential pressure pickup 116 generates a signal indicating a zero difference, provided that measuring orifices are equally sized. In contrast, if the flow of coolant through a winding bar 102 and 103 is insufficient for proper cooling, the throughput through the respective output tube section 114 and 113 is changed and a difference between the pressures at the measuring orifices 115 is generated. This pressure difference, if greater than a predetermined threshold amount, results in the production of a warning signal by evaluating circuit 117.

Figure 10:
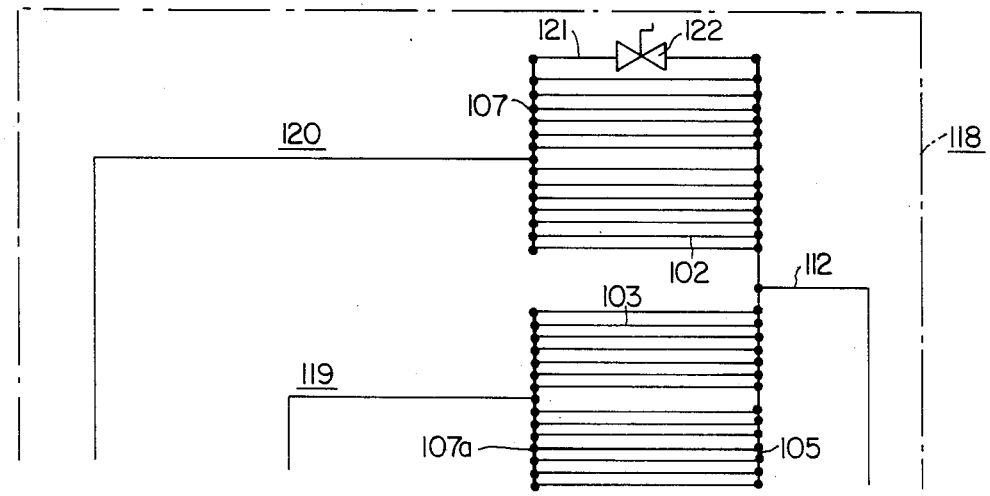
FIG. 10 is a diagram similar to FIG. 9, showing an alternative embodiment, in accordance with the invention, of the cooling system of that drawing figure.

FIG. 10 illustrates an embodiment of the invention wherein a bypass line 121 with an adjustable valve 122 is provided in parallel with subsidiary branches or winding bars 102 between semicircular manifold 107 and circular manifold 105 for enabling the equalization of flow capacity between the one group of winding bars 102 and the other group of winding bars 103. By controlling valve 122, the rates of coolant flow through tube sections 113 and 114 and, concomitantly, the pressures at the two measuring orifices 115 may be equalized for normal operation of the coolant system. If a disturbance arises, a pressure difference is generated which results in a warning signal produced by evaluating circuit 117.

Although the invention has been described in terms of particular embodiments and illustrations, one of ordinary skill in the art, in light of this teaching, can generate additional embodiments and modifications without departing from the spirit of or exceeding the scope of the claimed invention. Accordingly, it is to be understood that the descriptions and illustrations herein are proffered by way of example to facilitate comprehension of the invention and should not be construed to limit the scope thereof.

What is claimed is:

1. A cooling system for an electrical machine comprising a plurality of separate parts, said cooling system comprising:
    a hydraulic circuit including a plurality of parallel main branches each containing a multiplicity of substantially similar parallel subsidiary branches, each main branch being located in a respective part of the electrical machine, said hydraulic circuit further including a plurality of feed tubes equal in number to said main branches and a plurality of discharge tubes equal in number to said main branches, one of the feed tube and the discharge tube of each main branch being subdivided into a pair of tube sections connected in parallel to one another, each tube section being connected to approximately the half of the subsidiary branches of the main branch;
    circulation means including a pump operatively connected to said hydraulic circuit for circulating the liquid coolant therethrough;
    heat exchanger means operatively coupled to said hydraulic circuit for extracting heat energy from said coolant upon a passage thereof through said hydraulic circuit during operation of said electrical machine;
    throughput measuring means operatively coupled to said parallel tube sections for monitoring the rates of coolant flow therethrough during operation of said electrical machine;
    comparison means operatively linked to said throughput measuring means for comparing the rates of coolant flow through the tube sections of each pair of parallel tube sections and
    evaluating means operatively tied to said comparison means for generating a warning signal upon detecting that a measured difference between the rates of coolant flow through the tube sections of a pair of parallel tube sections differs from a preselected reference value by more than a predetermined amount.

2. The cooling system recited in claim 1, further comprising adjustment means operatively connected to at least one of said main branches for enabling the equalization of coolant flow through the tube sections of said one of said main branches.

3. The cooling system recited in claim 2 wherein said adjustment means includes an adjustable valve.

4. The cooling system recited in claim 3 wherein said adjustable valve is disposed in a bypass line extending parallel to the subsidiary branches of said one of said main branches.

5. The cooling system recited in claim 3 wherein said adjustable valve is disposed in a bypass line extending parallel to at least a portion of a tube section associated with said one of said main branches.

6. The cooling system recited in claim 2 wherein said adjustment means includes a plurality of adjustable valves equal in number to said main branches.

7. The cooling system recited in claim 6 wherein each of said adjustable valves is disposed in a respective bypass line extending parallel to the subsidiary branches of a respective main branch.

8. The cooling system recited in claim 6 wherein each of said adjustable valves is disposed in a respective bypass line extending parallel to a portion of a tube section associated with a respective main branch.

9. The cooling system recited in claim 2 wherein said comparison means includes a differential pressure pickup.

10. The cooling system recited in claim 2 wherein said throughput measuring means includes means for detecting the velocity of coolant flow through said tube sections.

11. The cooling system recited in claim 1 wherein said throughput measuring means continuously monitors the rates of coolant flow and wherein said comparison means continuously compares the rates of coolant flow.

12. The cooling system recited in claim 1 wherein said comparison means includes a differential pressure pickup.

13. The cooling system recited in claim 1 wherein said throughput measuring means includes means for detecting the velocity of coolant flow through said tube sections.

14. The cooling system recited in claim 1 wherein the electrical machine is a hydraulic power generator and wherein the separate parts of the electrical machine include a stator winding, a rotor winding, a stator lamination stack and pressure plates.

15. The cooling system recited in claim 1, further comprising a coolant processing plant operatively coupled to said hydraulic circuit.

16. A cooling system for an electrical machine comprising a plurality of separate parts, said cooling system comprising:
    a hydraulic circuit including a plurality of parallel main branches each containing a multiplicity of substantially similar parallel subsidiary branches, each main branch being located in a respective part of the electrical machine, said hydraulic circuit further including a plurality of feed tubes equal in number to said main branches and a plurality of discharge tubes equal in number to said main branches, the feed tube of each main branch being subdivided into a pair of tube sections connected in parallel to one another, each tube section being connected to approximately the half of the subsidiary branches of the main branch, while the discharge tube is connected to an output end of the subsidiary branches of said associated main branch;

circulation means including a pump operatively connected to said hydraulic circuit for circulating a liquid coolant therethrough;

heat exchanger means operatively coupled to said hydraulic circuit for extracting heat energy from said coolant upon a passage thereof through said hydraulic circuit during operation of said electrical machine;

throughput measuring means operatively coupled to said parallel tube sections for monitoring the rates of coolant flow therethrough during operation of said electrical machine;

comparison means operatively linked to said throughput measuring means for comparing the rates of coolant flow through the tube sections of said pair of parallel tube sections; and evaluating means operatively tied to said comparison means for generating a warning signal upon detecting that a measured difference between the rates of coolant flow through the tube sections of a pair of parallel tube sections differs from a preselected reference value by more than a predetermined amount.

17. A cooling system for an electrical machine comprising a plurality of separate parts, said cooling system comprising:

a hydraulic circuit including a plurality of parallel main branches each containing a multiplicity of substantially similar parallel subsidiary branches, each main branch being located in a respective part of the electrical machine, said hydraulic circuit further including a plurality of feed tubes equal in number to said main branches and a plurality of discharge tubes equal in number to said main branches, the discharge tube of each main branch being subdivided into a pair of tube sections connected in parallel to one another, each tube section being connected to approximately the half of the subsidiary branches of the main branch, while the feed tube is connected to an input end of the subsidiary branches of said associated main branch;

circulation means including a pump operatively connected to said hydraulic circuit for circulating a liquid coolant therethrough;

heat exchanger means operatively coupled to said hydraulic circuit for extracting heat energy from said coolant upon a passage thereof through said hydraulic circuit during operation of said electrical machine;

throughput measuring means operatively coupled to said parallel tube sections for monitoring the rates of coolant flow therethrough during operation of said electrical machine;

comparison means operatively linked to said throughput measuring means for comparing the rates of coolant flow through the tube sections of each pair of parallel tube sections; and evaluating means operatively tied to said comparison means for generating a warning signal upon detecting that a measured difference between the rates of coolant flow through the tube sections of a pair of parallel tube sections differs from a preselected reference value by more than a predetermined amount.

* * * * *